United States Patent Office.

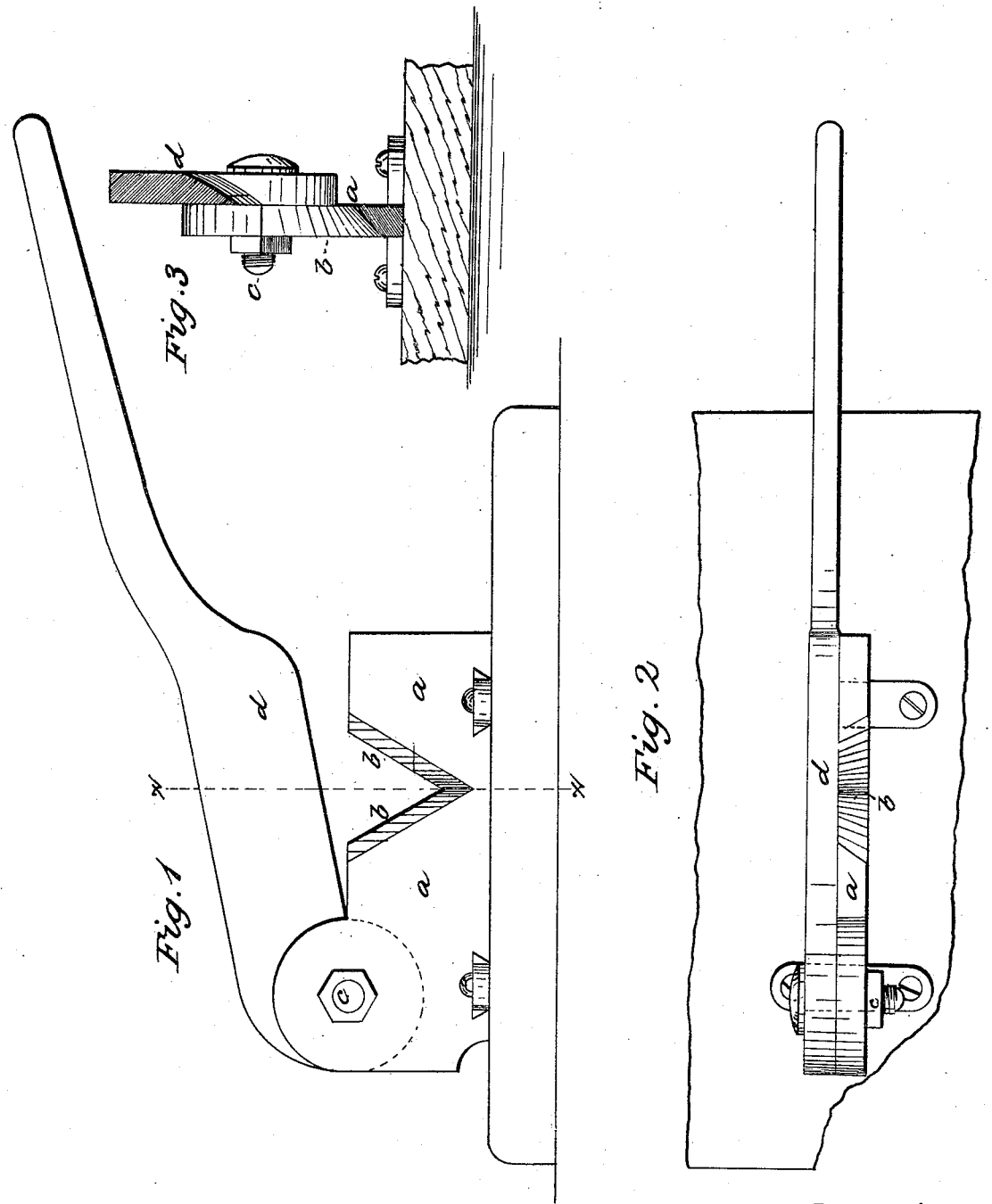

CHARLES BROMBACHER, OF NEW YORK, N. Y.

Letters Patent No. 63,205, dated March 26, 1867.

---

IMPROVED SHEARS FOR BRUSHES.

---

*The Schedule referred to in these Letters Patent and making part of the same.*

---

TO ALL WHOM IT MAY CONCERN:

Be it known that I, CHARLES BROMBACHER, of the city and State of New York, have invented, made, and applied to use, a certain new and useful Improvement in Shears for Brushes and other loose or fibrous materials; and I do hereby declare the following to be a full, clear, and exact description of the said invention, reference being had to the annexed drawing, making part of this specification, wherein—

Figure 1 is a side view of my improved shear.

Figure 2 is a plan of the same; and

Figure 3 is a section at the line $x\ x$, fig. 1.

Similar letters refer to the same parts.

In cutting bristles and other fibrous or loose materials, great difficulty has arisen from the cut not being square across the materials, because the action of the pressure in cutting causes the lower or last portions cut to be pressed back or away from the lower shear or cutter. Clamps have been employed to overcome this difficulty, but they are not easily employed and not always reliable. Cutters have also been employed where the cutting edges have been curved or concave, but they do not act with uniformity in cutting such loose materials as bristles.

The nature of my said invention consists in a bed-shear formed with a V-shaped cutting edge and jointed directly to a straight or nearly straight blade, fitted to swing across such V-shaped cutter, and form both a clamp and cutter between the three cutting edges. I find, practically, that this character of cutter makes a clean, square cut across such loose or fibrous materials as are used for brushes and brooms, and prevents the necessity of dressing the ends off square by several successive cuts, thus saving time and preventing loss of material.

In the drawing, $a$ is the bed-shear, with a V-shaped notch bevelled to form cutting edges, as at $b$. $c$ is the joint, and $d$ the straight or nearly straight shear, operated by a lever so as to be moved across the triangular notch $b$. The size of this shear may be such that the notch $b$ can receive any sized bundle of bristles, fibres, or loose materials, and they will be held within the three shear or cutting edges, each operating with uniformity, so that the cut will be square across, whether a large or a small bundle, or even a single hair or fibre is introduced into the machine. The three cutting edges hold firmly between them the bristles or other articles to be cut, maintaining that hold upon them until all the fibres are separated; hence the shear acts as a clamp as well as a cutter, and there is no chance for the cut to be slanting.

What I claim, and desire to secure by Letters Patent, is—

The triangular opening in the bed-shear $a$, in combination with the swinging blade or shear $b$, hinged directly to the shear $a$, and acting as a clamp and cutter, as specified.

In witness whereof I have hereunto set my signature this nineteenth day of January, A. D. 1867.

CHAS. BROMBACHER.

Witnesses:
  CHAS. H. SMITH,
  GEO. D. WALKER.